United States Patent [19]

O'Neill et al.

[11] Patent Number: 4,807,480
[45] Date of Patent: Feb. 28, 1989

[54] FLOW MEASUREMENT/METERING

[75] Inventors: Brian C. O'Neill; Christopher A. Willis, both of Nottingham, England

[73] Assignee: National Research Development Corporation, London, England

[21] Appl. No.: 893,236

[22] Filed: Aug. 5, 1986

[30] Foreign Application Priority Data

Aug. 6, 1985 [GB] United Kingdom ............... 8519688

[51] Int. Cl.$^4$ ............................................. G01F 1/74
[52] U.S. Cl. .................................... 73/861.04; 73/28
[58] Field of Search ........... 73/861.04, 861.05, 861.07, 73/861.09, 28; 364/510; 324/455, 71.4, 464

[56] References Cited

U.S. PATENT DOCUMENTS

| | | | |
|---|---|---|---|
| 3,184,967 | 5/1965 | Rogers | 73/861.05 X |
| 3,449,667 | 6/1969 | Gourdine | 73/861.04 X |
| 3,679,973 | 7/1972 | Smith, Jr. et al. | 73/28 X |
| 3,839,910 | 10/1974 | Fitch | 73/861.05 |
| 4,104,913 | 8/1978 | Cockshott et al. | 73/861.09 |
| 4,186,601 | 2/1980 | Maruoka | 73/861.05 |
| 4,387,602 | 6/1983 | Lao | 73/861.09 |
| 4,448,082 | 5/1984 | Bariol et al. | 73/861.05 |

Primary Examiner—Charles A. Ruehl
Attorney, Agent, or Firm—Cushman, Darby & Cushman

[57] ABSTRACT

Powder mass flow rates are measured by constraining the powder to flow within an apparatus which injects a charge into the powder at a first position and measures at a plurality of positions downstream from the first position the charge remaining in the powder and means for calculating from the injected and remaining charge the powder mass flow.

8 Claims, 14 Drawing Sheets

SYSTEM ELECTRONICS, BLOCK DIAGRAM

Fig. 6 SYSTEM ELECTRONICS, BLOCK DIAGRAM

Fig. 7  AUTOMATIC GAIN CONTROL, BLOCK DIAGRAM

Fig. 8    POWDER VELOCITY C.C.T. BLOCK DIAGRAM

Fig. 9  VELOCITY CALIBRATION C.CT. BLOCK DIAGRAM

Fig. 10  CORONA INJECTION CURRENT GENERATOR, BLOCK DIAGRAM

Fig. 11

Fig. 12 H.T. TRIGGER DRIVER (CONSTANT TIME INJECTION CURRENT).
BLOCK DIAGRAM

Fig. 13 POWDER BALANCE ANALOGUE O/P TO M.F.R CONVERSION, BLOCK DIAGRAM

FLOW MEASUREMENT/METERING

The present invention relates to the measurement and metering of flow rates and more particularly to the measurement of the flow of powder delivered in an air/powder mixture to a using apparatus.

A typical use of an air/powder mixture is in the spraying of articles by coating the articles with a powder, possibly using electrostatic attraction and then subsequently heat treating the article to "fix" the powder to the article to form a painted surface. In such processes it is advantageous to be able to measure the rate of powder flow since this enables the rate of powder flow to be controlled to the desired rate necessary for efficient coating of the articles.

A known method for measuring the rate of flow of powder is to redirect the powder flowing from a spray gun head and to collect the powder flowing in a measured time on a balance which gives a reading of the flow rate. There are a number of disadvantages with the known system. Firstly the spray process has to be stopped to allow the powder to be diverted to the measuring balance. Secondly the measurement may be inaccurate since the powder is diverted from its normal route and thirdly since the spray process has to be stopped the measurements tend to be only taken occasionally and at infrequent intervals. Thus for long periods the spray process may be wrong and scrap or inferior quality articles may be produced.

The present invention seeks to obviate the above disadvantage and to provide a powder flow measurement apparatus which may be used while the powder consuming apparatus, such as a spray gun, is in use.

According to the present invention there is provided flow measurement apparatus for the measurement of the flow of powder including means for injecting a charge into the powder flowing past a first point and means for detecting at one or more points downstream from the first point the charge conveyed by the powder.

Preferably the continuous measurements of mass flow is achieved by the pulse charging technique by the method of injecting a pulse of charge into the powder/air mixture stream via a corona needle located along the axis of the detector and by measuring by means of sensors located downstream the amount of charge conveyed. The powder mass flow rate is related to the ratio of injected charge to conveyed charge and a velocity which is obtained by time of flight measurements between sensors.

Preferably the charge remaining is detected at three points downstream from the first point. Preferably each point is equidistant from the previous point.

Preferably the powder flow is within a tube, the charge at each location being measured using a conductive annulus each annulus being preferably set into the internal wall of the tube to be flush therewith thereby not inhibiting the powder flow.

The tube is preferably surrounded by a Faraday cage for accurate measurement.

Embodiments of the present invention will now be described, by way of example with reference to the accompanying drawings, in which.

Figure 1:
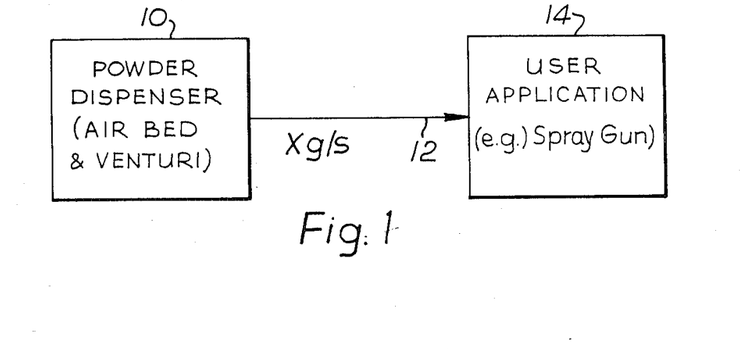
FIG. 1 shows a simple diagrammatic application of a powder flow apparatus.

With reference to FIG. 1, a simplified use diagram shows a powder dispenser 10 which supplies powder via a line 12 to a user application 14 such as a spray gun etc.

Figure 2:
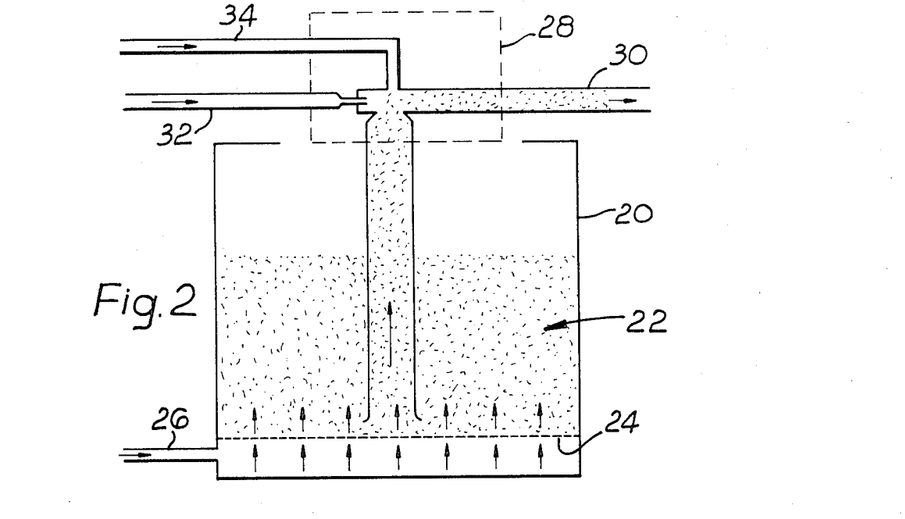
FIG. 2 shows diagrammatically a typical fluid air bed.

The powder dispenser 10 is typically of the known fluidised bed type as shown in FIG. 2 comprising a main powder hopper 20 filled with powder 22 which is aerated by air blown through a porous membrane base 24 by air supplied through a first air inlet 26. The air aerates the powder 22 enabling it to flow freely. The powder dispenser may also be of any known high pressure type for example a system operating in the range of 4 to 10 bars pressure.

A venturi unit 28 transfers the powder from hopper 20 to a feed pipe 30. The venturi unit is controllable and comprises two air inlets, a primary air inlet 32 and a secondary air inlet 34. The amount of powder fed to pipe 30 is controlled by the primary air supply 32 and the powder to air ratio can be reduced by introducing secondary air via inlet 34. The secondary air reduces the suction venturi effect of the primary air on outlet pipe 30 and thus the output mass flow rate can be controlled.

Figure 3:
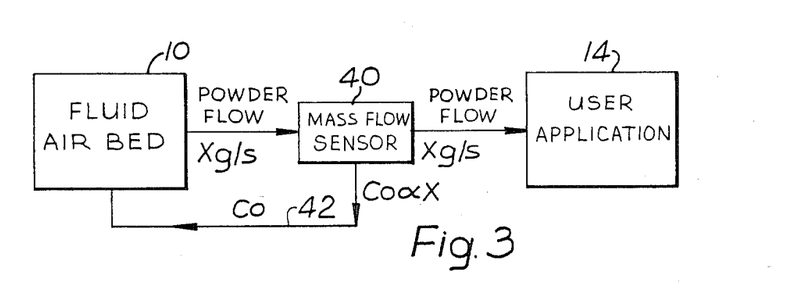
FIG. 3 shows the apparatus of FIG. 1 equipped with a flow measurement apparatus and feedback control.

With reference to FIG. 1 it may be seen that there is no feedback to enable such flow control to be achieved. In order to achieve feedback it is necessary to install a mass flow measurement sensor as shown in FIG. 3. The mass flow sensor 40 is connected into the outlet pipe 30 and its output is used via line 42 to control the secondary air pressure 34 to adjust the mass flow of powder within certain limits defined principally by the fluidised air bed limitations and particularly the user application.

Figure 4:
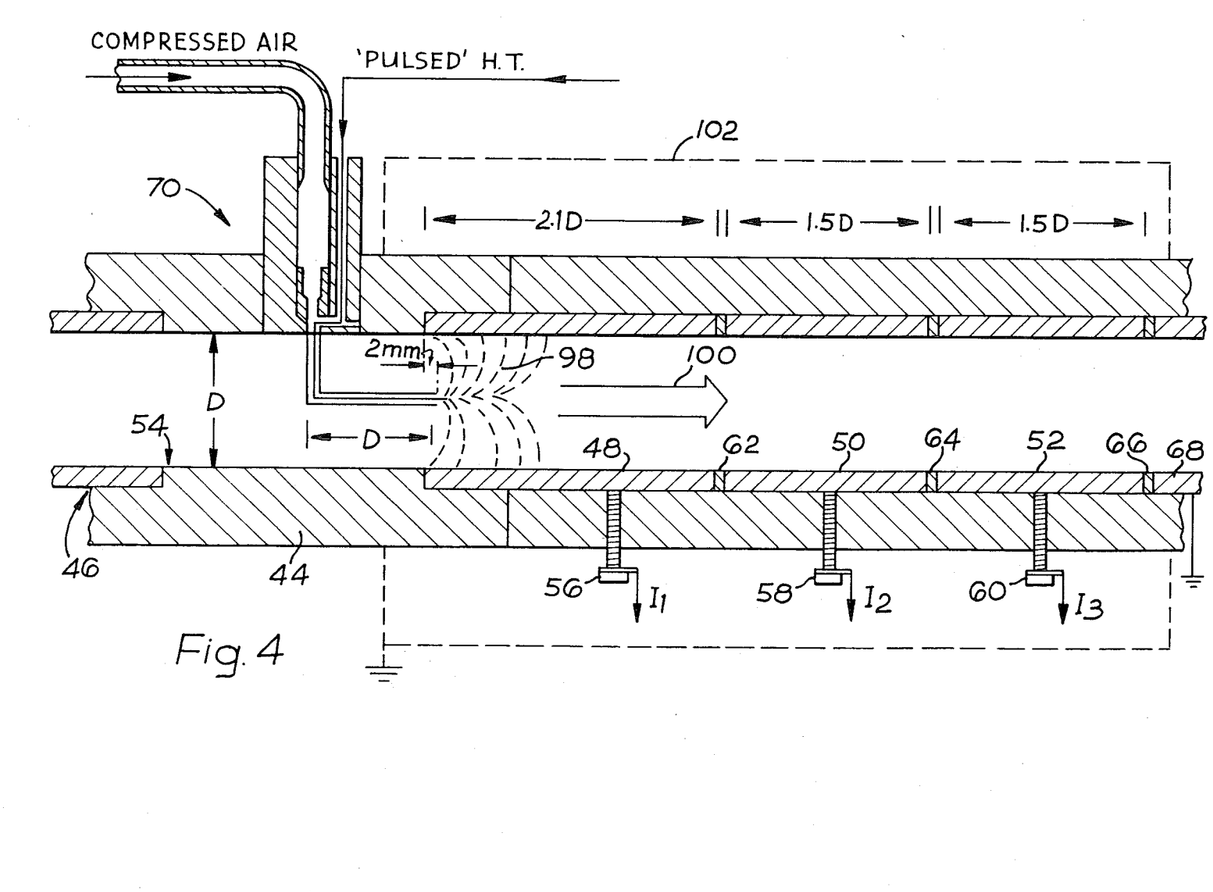
FIG. 4 shows a flow measurement sensor according to the present invention.
Figure 6:
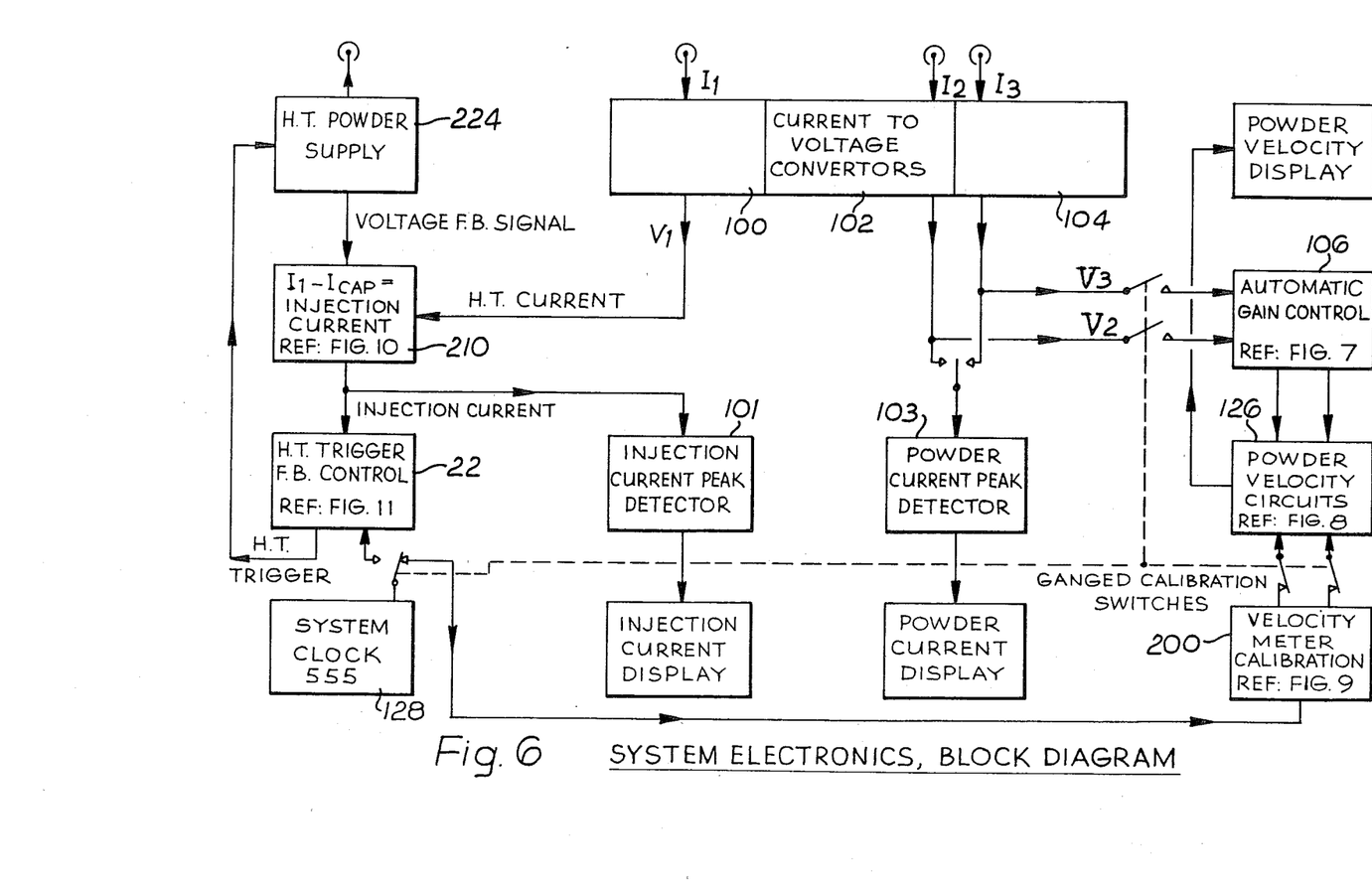
FIG. 6 shows in block diagram form an electronic control circuit for the measurement of powder flow using the sensor of FIG. 4.

With reference to FIG. 4 a mass flow sensor is shown, which in combination with the electronic processing circuitry shown in FIG. 6 gives an output signal proportional to the measured flow rate which is used to adjust the secondary air pressure.

The sensor 40 comprises an outer wall section 44 which fits as indicated at 46 into the outlet pipe 30. The wall section 44 is of an electrical insulating material and has internally mounted therein a number of annular sections 48, 50, 52. The annular sections and the internal diameter D of wall section 44 are substantially flush with the internal diameter D of pipe 46 as indicated at 54.

Each annular section is connected through the wall 44 to an electrical contact 56, 58, 60, currents $I_1$, $I_2$ and $I_3$ being thereby respectively obtainable in operation of the sensor. Interposed between each annular section is an insulating annular ring 62, 64 and 66 the latter separating the last section 52 from a fourth annular section 68 which is earthed. Annular section 68 may be of a different size to the sections 48, 50 and 56.

Figure 5:
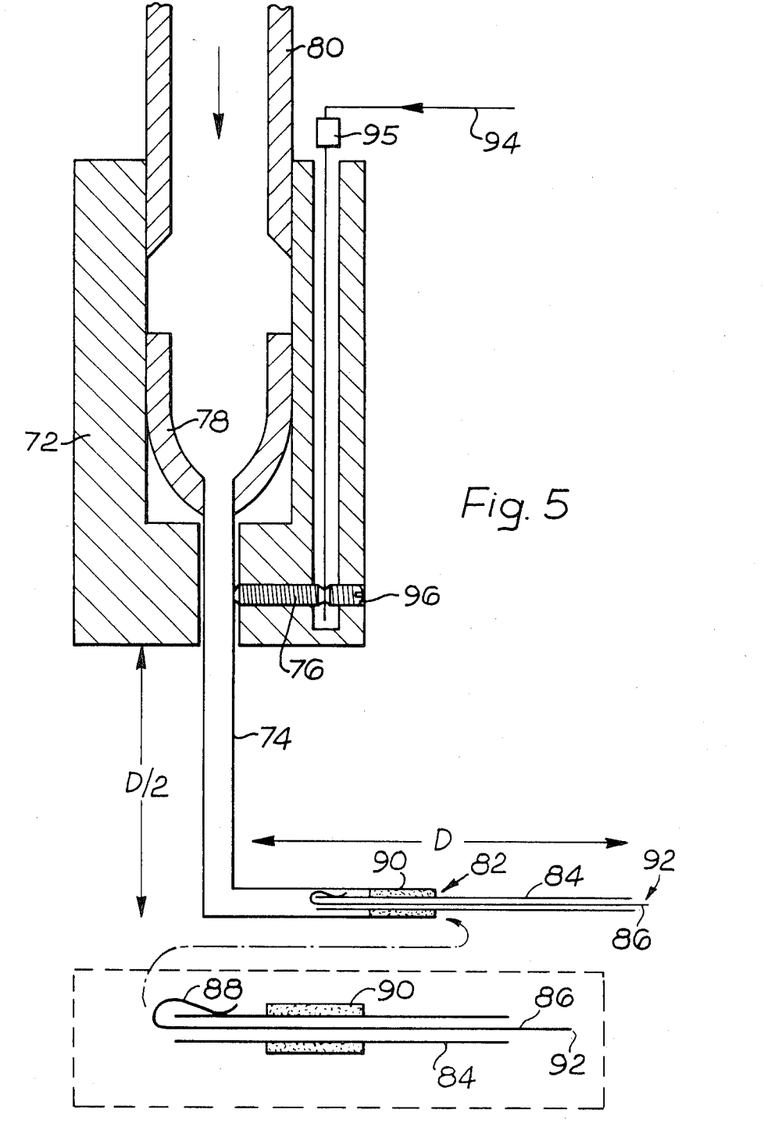
FIG. 5 shows a charge injection unit for use in the sensor of FIG. 4.

A charge injection unit 70 shown in greater detail in FIG. 5, to which reference is now made is mounted at the upstream end of the sensor as shown. The charge injection unit comprises a hollow cylinder 72 made of electrical insulating material. A conductive metal tube 74 is fitted into the closed end of cylinder 72 by for example a first grub screw 76, the upper end of tube 74 being provided with a cup 78 which seals the tube against the internal wall of cylinder 72.

Compressed air is supplied into cylinder 72 via tube 80 and consequently passes down tube 74 to exit at the end 82. At the end of tube 74 is positioned a smaller tube 84 within which a wire 86 (of diameter approximately 100 micrometres) is positioned. Wire 86 is electrically connected to wire 94 which in turn is connected via a resistor 95 (not shown) which is typically a 100 Megohms to a high voltage pulse supply. Tube 84 is fixed into tube 74 for example a ring of glue 90. A high tension pulse therefore applied to the tip 92 of wire 86 from wire 94 which is electrically connected to tube 74 by a further clamping grub screw 96.

Thus compressed air is forced past the tip 92 of wire 86 and when the high voltage is applied to wire 86 a corona 98 is formed at the tip 92 thereby charging powder particles passing down tube 30 (as indicated by arrow 100). The compressed air forced past the tip 92 of wires 86 serves to keep the tip free of powder thereby preventing the degradation of charge injection performance due to alteration of the shape of the tip 92.

The design of injection system is such as to produce a reliable charge injection and has the following important features:

(1) Small radius point electrode.
(2) Reduction of space charge quenching.
(3) Clean injection environment.

(1) Small radius point electrode; the electric field intensity on the surface of the point electrode is approximately inversely proportional to the square of the point electrode tip radius. For a given voltage a small radius tip will produce a greater field, and therefore enhance the charge injection. A second feature of the reduced point electrode's radius is that lower operating voltages may be utilised.

(2) Reduction of space charge quenching; space charge quenching is due to charged particles (ions or charged powder) not migrating away to the earthed plane electrode fast enough in the case of ions or not moving downstream fast enough in the case of charged powder. The charged particles slow movement relative to the ion movement induces a greater reverse field component which results in the attenuation of the charge injection current. This space charge quenching is reduced by the needle air displacing the charged particles from the critical region around the point electrode.

(3) Clean injection environment; the compressed air passing through the hypodermic needle ensures that the powder does not block the point electrode. A clean sharp needle point is essential for efficient charge injection, and powder deposits on the needle point destroys it's profile and therefore degrades it's performance. The protection of the needle point by the compressed air is the main advantage of the charge injector unit.

Any large variations to the needle air pressure results in fluctuations of the injected charge's forward velocity. Consequently this alters the relative position between the ionisation region and sensors, with a resulting loss of accuracy in the velocity and current data. Therefore it is preferably for the needle air to be maintained at a constant pressure. 13 psi is found to be the optimum needle air pressure for 100 micrometer wire. At low pressures the point electrode tends to become clogged, and at high pressures the accuracy of the velocity data falls due to the needle air propelling the powder forward.

The sensors measure the charges $Q_1$, $Q_2$, $Q_3$ received in a predetermined period of time. For the purposes of the present description these charges will be measured as currents $I_1$, $I_2$ and $I_3$ using current sensors in which the sensors are earthed through current amplifiers and are electrically isolated from each other by washers. The length of sensor 48 is 2.1D (D=diameter of tube) and is made such that when there is no powder flowing, no significant signal is detected by sensor $I_2$. The ions are carried some way downstream from the needle point electrode towards the $I_2$ sensor by the air from the needle and also by the 'corona wind'. The length of sensors 50 and 52 is identical and is calculated by the following requirement. If a charge 'q' is placed axially halfway along the length of the sensor, a significant proportion of the electric field lines generated by 'q' should be contained within that sensor. This ensures that the maximum signal is obtained for a minimum length of sensor. This length is typically 1.5D.

There are two further points regarding sensor 48. Firstly, the needle point 92 protrudes a distance (2 mm) into the $I_1$ sensor. If the needle point is not within the $I_1$ sensor, charge is deposited upon the large area of insulating surface upstream from the $I_1$ sensor. This causes electrical surface discharges to occur which seriously disrupt the current transducers downstream. It is also for this reason that for some distance downstream of the sensors the pipe wall is conducting and earthed as indicated by annulus 68. The second point is that the $I_1$ sensor is approximately one diameter downstream from where the hypodermic needle protrudes through the pipe wall. This is to ensure that no surface discharges occurs between the $I_1$ sensor and the point where the hypodermic needle protrudes from the pipe wall.

Finally, all the current sensors are enclosed within a 'Faraday cage' to protect the sensitive current sensors from external pick-up.

With reference now to FIG. 6 the system electronics comprises first, second and third current to voltage converters 100, 102, 104 which convert the currents $I_1$, $I_2$ and $I_3$ into voltages upon which the subsequent electronic circuitry operates. Conventional high input impedance FET operational amplifiers may be used.

Figure 7:
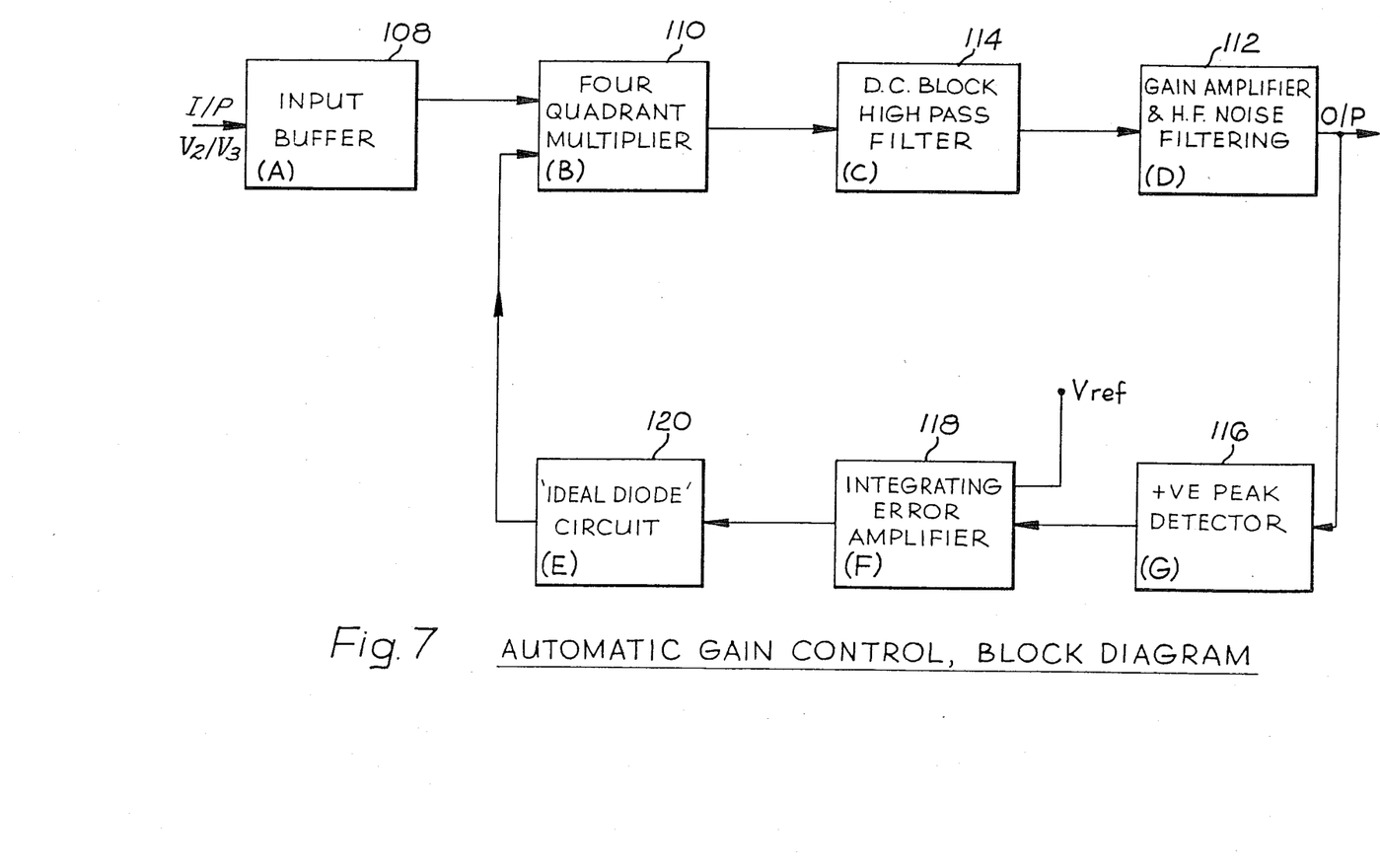
FIG. 7 shows in block diagram form in greater detail the automatic gain control circuit of FIG. 6.

The voltage outputs $V_2$, $V_3$ proportional to $I_2$, $I_3$ are fed to an automatic gain control circuit 106 shown in greater detail in FIG. 7. The circuitry comprises two identical channels of which only one is shown for simplicity. The voltage input is buffered by a buffer 108 and fed to a four quadrant multiplier 110 which provides an amplified output to an output buffer amplifier and high frequency noise filter circuit 112 via a high pass filter 114. The output of amplifier 112 is fed back to a positive peak detection circuit 116 which determines the maximum amplitude of the output signal. This is compared with a reference voltage Vref in an integrating error amplifier. The output of amplifier 118 is used via a diode circuit 120 to control the amplification factor of multiplier 110 to ensure that the peak amplitudes of both voltages representing $I_2$ and $I_3$ are the same when outputs from amplifier 112 thereby allowing the time difference between the two signals to be more clearly determined.

The purpose of the circuit 106 is to ensure that $V_2$ and $V_3$ are adjusted to be equal in amplitude. The magnitude of $I_2$ and $I_3$ and hence $V_2$ and $V_3$ is dependant on the powder mass flow rate and changes in the relative and absolute magnitudes of $I_2$ and $I_3$ lead to serious timing errors in the velocity timing circuit 126 (described in greater detail in FIG. 8). Since the velocity timing is dependant on the accurate measurement of the time difference between the pulse signals I and $I_3$, (obtained as a result of introducing a pulsed change via injector 92 at defined time intervals set by the system clock circuit 128), such errors are unaccpetable. The automatic gain circuits reduces this source of error.

Figure 8:
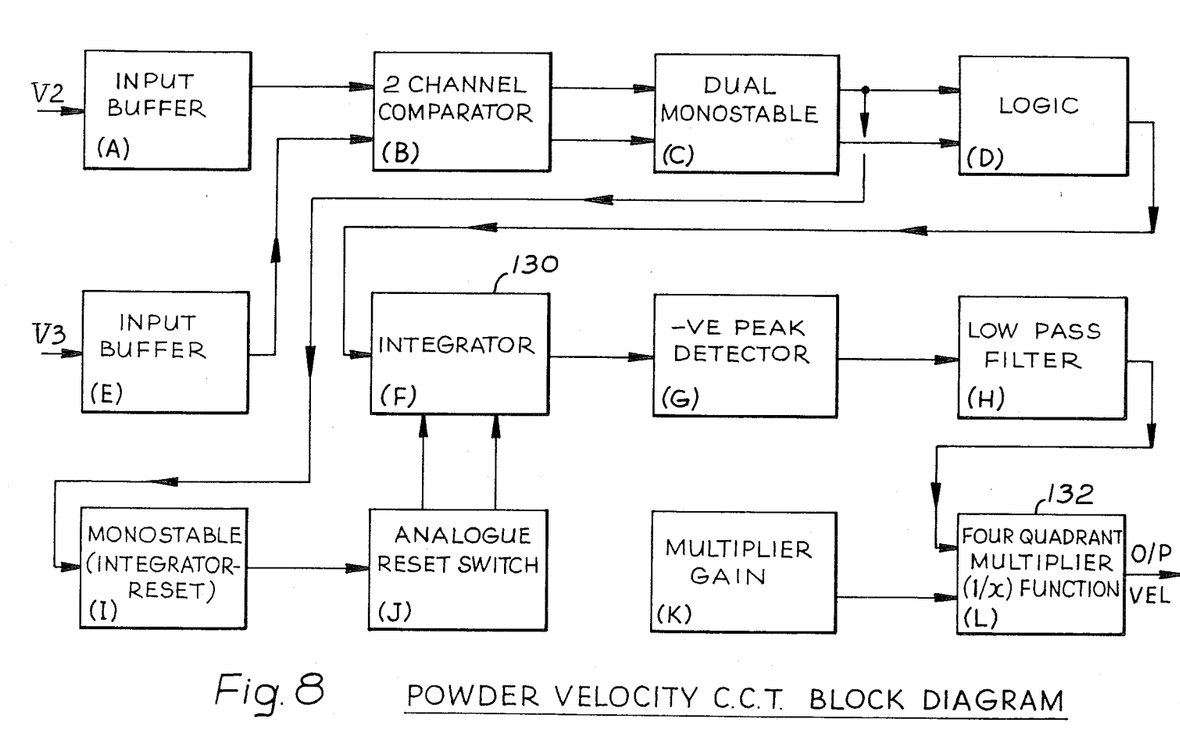
FIG. 8 shows the powder velocity circuit of FIG. 6 in block diagram, form.

The outputs of the automatic gain control circuits are fed to the powder velocity circuit 126 the main element of which (see FIG. 8) is an integrator 130 which produces a voltage proportional to the time difference between the rise of $I_2$ and $I_3$. The velocity of the powder is proportional to the inverse of this voltage:

$$Vel = d/t$$

where d=distance between $I_2$ and $I_3$ detectors.

A four quadrant multiplier 132 is used to perform this calculation and therefore the output level of circuit 126 is proportional to the powder velocity.

Figure 9:
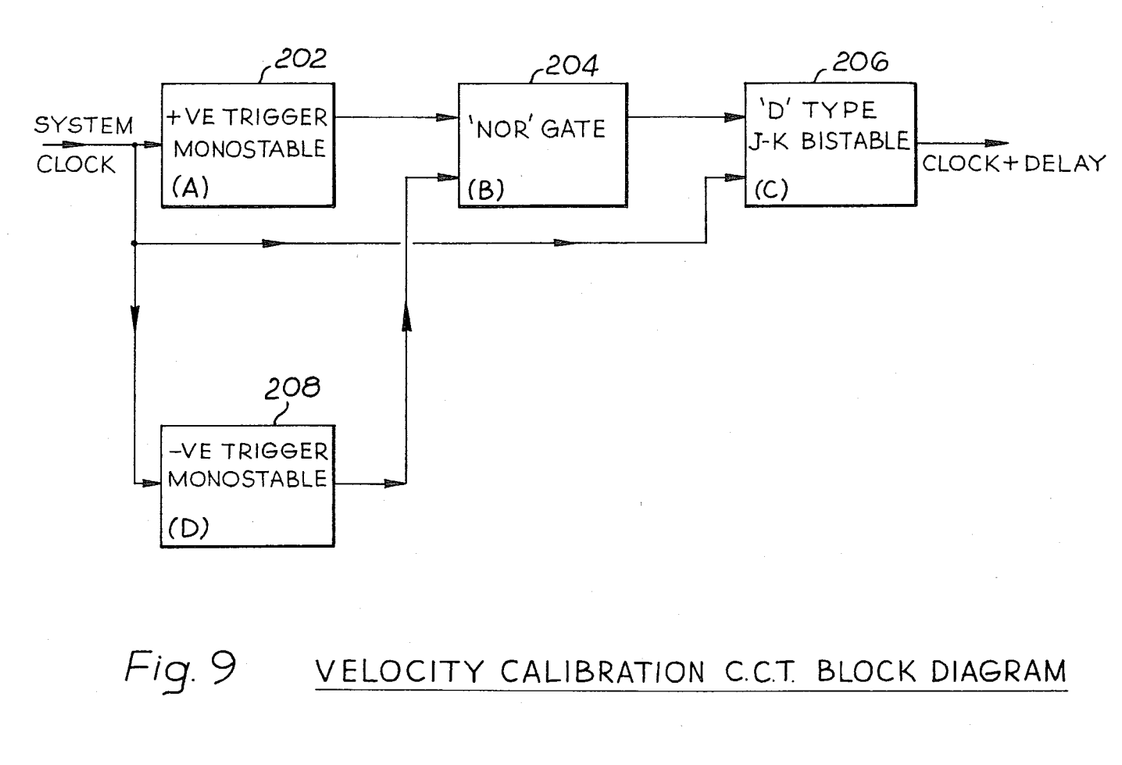
FIG. 9 shows the velocity calibration circuit of FIG. 6 in block diagram form.

To ensure that the powder velocity circuit is giving accurate readings the circuit may be calibrated at desired intervals at a velocity meter calibration circuit 200 (see also FIG. 9). This circuit comprises a positive trigger monostable 202 which feeds via a NOR gate 204 one input of a D type J-K bistable circuit 206. A negative trigger bistable feeds the other input of bistable 206. The output of the circuit therefore represents a known phase delay input.

Figure 10:
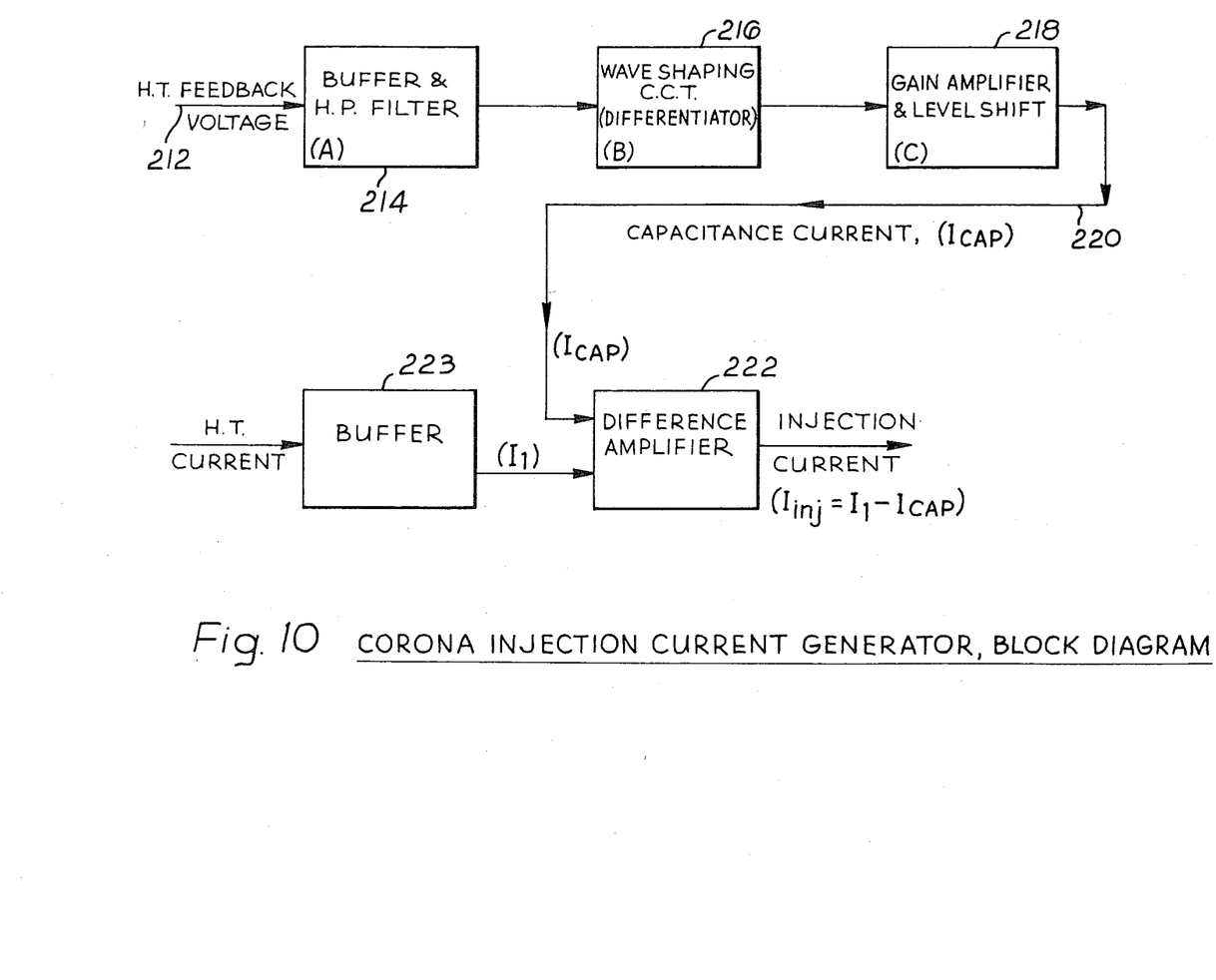
FIG. 10 shows the corona injection circuit of FIG. 6 in block diagram form.

The current detected by sensor 40 is converted to a voltage $V_1$ and this is fed to a corona injection current generator circuit 210 (FIG. 10). The current $I_1$ has two components one capacitive and the other an injection component because the detector is so close to the injection point. It is possible by using the voltage feedback signal 212 from the H.T. power supply to synthesise the capacitive component of current $I_1$. This synthesised component is formed by buffering and high pass filtering the H.T. voltage 212 in a circuit 214, differentiating the output of circuit 214 in a differentiator 216 and amplifying and level shifting the output of circuit 216 in a circuit 281 to produce a voltage output 220 proportional to the capacitive component of the injection current which is fed to one input of a differential amplifier 222 the other input of which is the buffered current $I_1$.

The output of amplifier 222 is the injection current ($Iinj = I_1 - I_{CAP}$).

Figure 11:
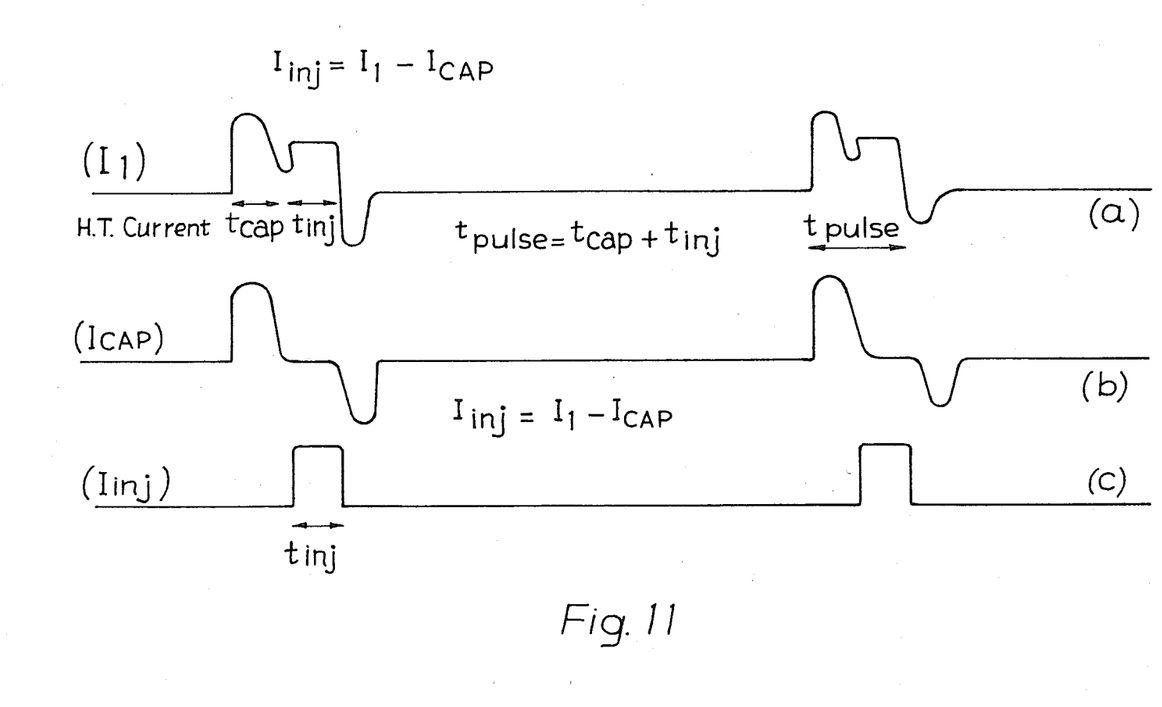
FIG. 11 shows waveforms of capacitive and injected current.

With reference to FIG. 11 the current waveforms (a), (b) and (c) show respectively the output current $I_1$, the capacitive component $I_{CAP}$ and the injected component $I_{INJ}$ formed by subtracting (b) from (a). In a practical embodiment the current was obtained from a voltage of approximately 6KV and the time $t_{inj}$ was approximately 1 millisec.

Figure 12:
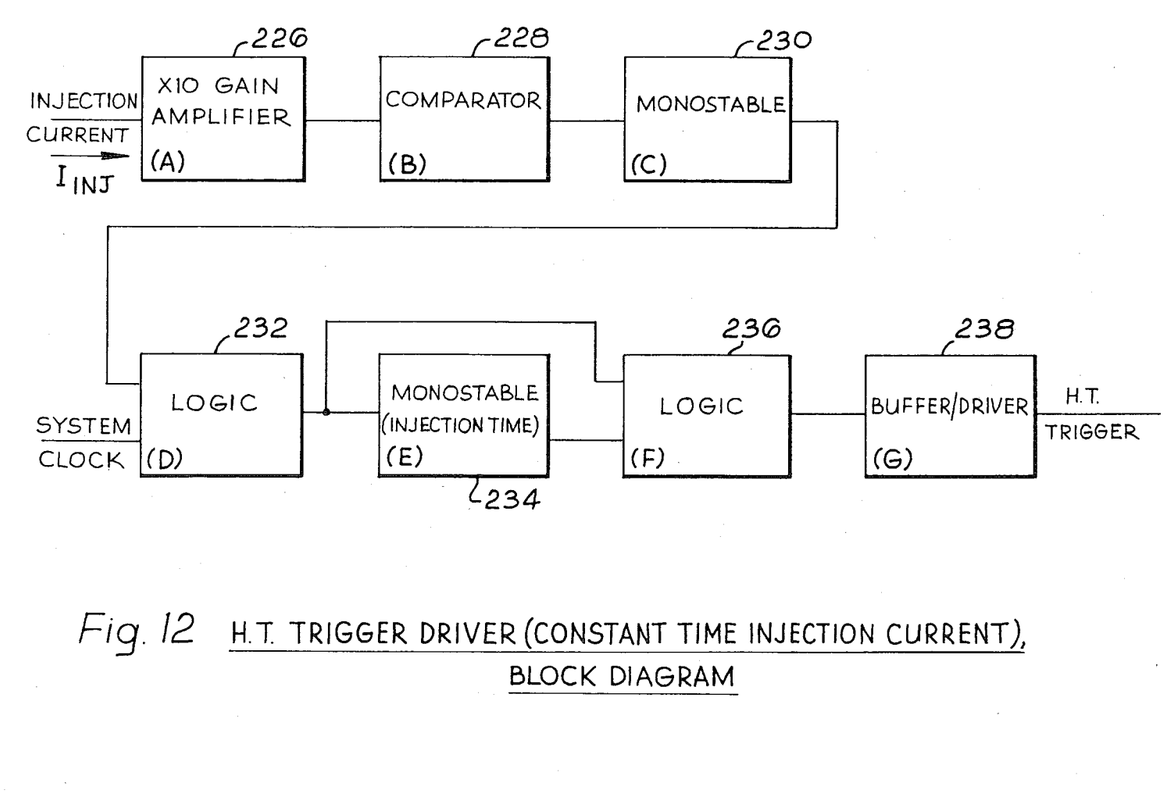
FIG. 12 shows the high tension trigger driver circuit of FIG. 6 in block diagram form.
Figure 13:
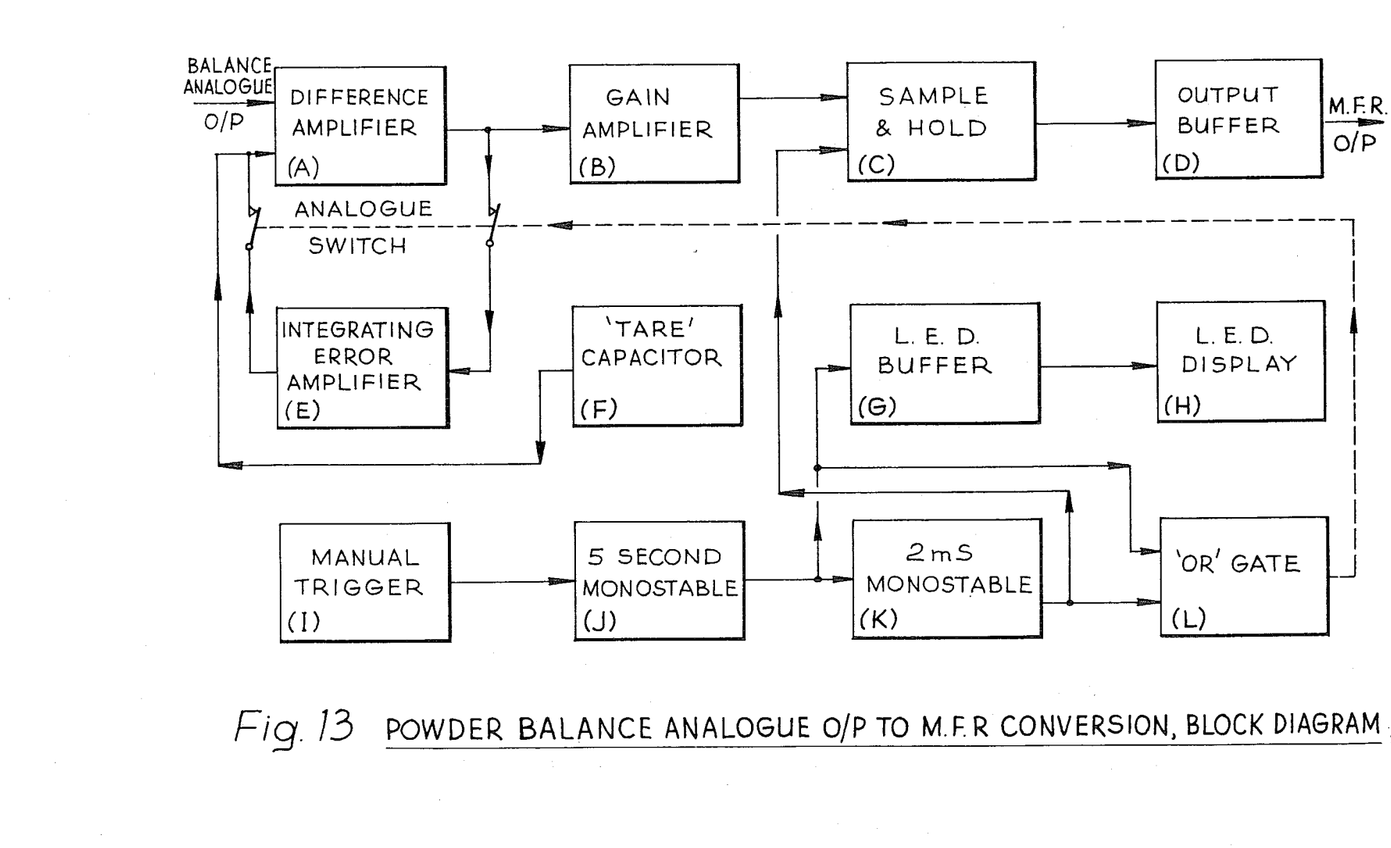
FIG. 13 shows the powder balance analogue output to M.F.R. conversion circuit in block diagram form.

Charge is injected into the powder using a pulsed H.T. (high tension) power supply circuit 224 shown in greater detail in FIG. 12. The circuit is required to supply a constant width injection current $I_{INJ}$ and from FIG. 11 is can be seen that:

$$t_{pulse} = t_{cap} + t_{inj}$$

where $t_{cap}$ in the time taken for the potential or voltage at the needle point 92 to be sufficient to sustain the charge injection. This time is not constant but is variable and increases as the powder mass flow rate increases. Therefore in order to obtain a constant injection time ($t_{inj}$), tpulse must be adjusted with $t_{cap}$. The circut of FIG. 12 uses the detection of $I_{INJ}$ to indicate the onset of injection because the capacitive component of the H.T. current masks the commencement of the injection current.

The injection current is amplified in a times ten amplifier 226, fed via a comparator 228 (which effectively detects the start of the current when the current rises above a preset level) and a monostable 230 which provides an input pulse into a logic circuit 232 set by the system clock input. The output to logic circuit 232 is used to fire a further monostable 234, which is set to the desired maximum injection time, and an output H.T. trigger pulse is provided via a further logic circuit 236 and driver 238.

The system clock is derived for example from a conventional integrated circuit timing chip (e.g. a 555). In a preferred example the timer 128 provides a six millisecond square wave at a repetition rate of fifty cycles per second thereby giving a sampling rate of fifty per second.

The H.T. power supply 224 is of conventional design with an external trigger input supplied from the H.T. trigger control circuit.

To set up the apparatus it is necessary to divert the powder from flowing to the end user, to a balance so that the apparatus can be calibrated. Thus the absolute powder mass flow can be measured and compared with the current outputs of the sensors to calibrate the apparatus.

The powder mass flow rate is calculated from the peak current readings $I_2$ and $I_3$, and injected current $I_{INJ}$ obtained in circuits 101, 103, and the powder velocity obtained in circuit 126 using constants derived from the calibration process as follows:

For a 14 mm ID pipe at normal pressures and a specific gravity of powder of approximately 2, four functions are defined which are used to measure the powder mass flow rate:

$R1 = I_2/I_{INJ}$
$R2 = I_2/I_3$
$D22 = (I_2 - I_3)^{1.4}/I_{INJ}$
$S22 = (I_2/I_3)^{0.66} \times$ powder velocity Using the above functions the apparatus divides the powder mass flow rates into three ranges i.e. low, medium and high flow rates.

1. LOW FLOW RATE

Figure 14:
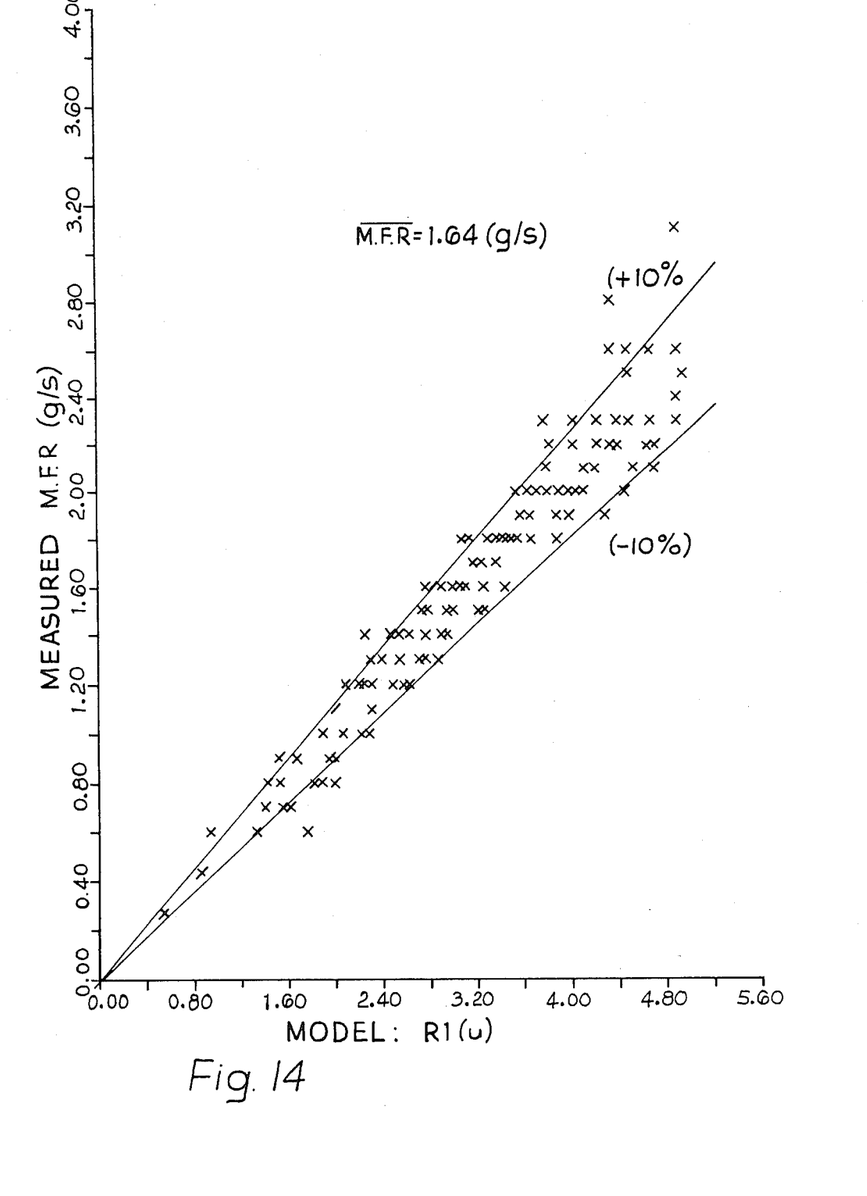
FIG. 14 shows a graph for calculation of low mass flow rates.

For low flow rates $R1<5$ and $R2<1.4$ and when this criteria is obtained it is known that the flow rate is low and the actual flow rate can be obtained from the value of R1 using the graph of FIG. 14. In a practical apparatus the low flow rate covers the range of up to 2.8 grammes per second. In the graph shown in FIG. 14 which shows the spread of readings obtained in practical list using a measuring balance over 90% of the data lies within a 10% margin.

2. MEDIUM FLOW RATE

Figure 15:
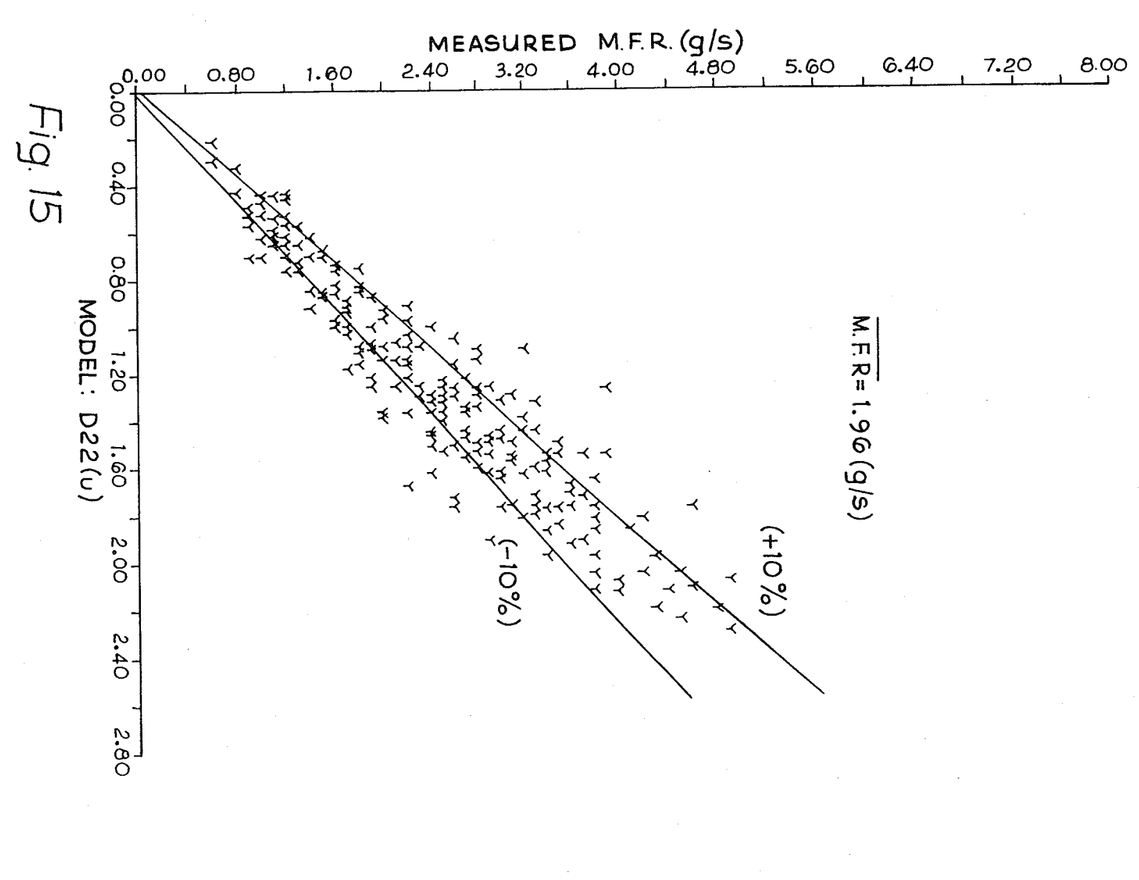
FIG. 15 shows a graph for calculation of medium mass flow rates.

For medium flow rates the criteria $S22<9$ and $R2<1.6$ is used and the actual flow rate is obtained from the graph of FIG. 15 which uses the quantity D22. The flow range overlaps that of the low flow rate and is usable within a 10% error rate from 0.6 to 4.0 grammes per second for over 85% of the readings calibrated.

3. HIGH FLOW RATE

Figure 16:
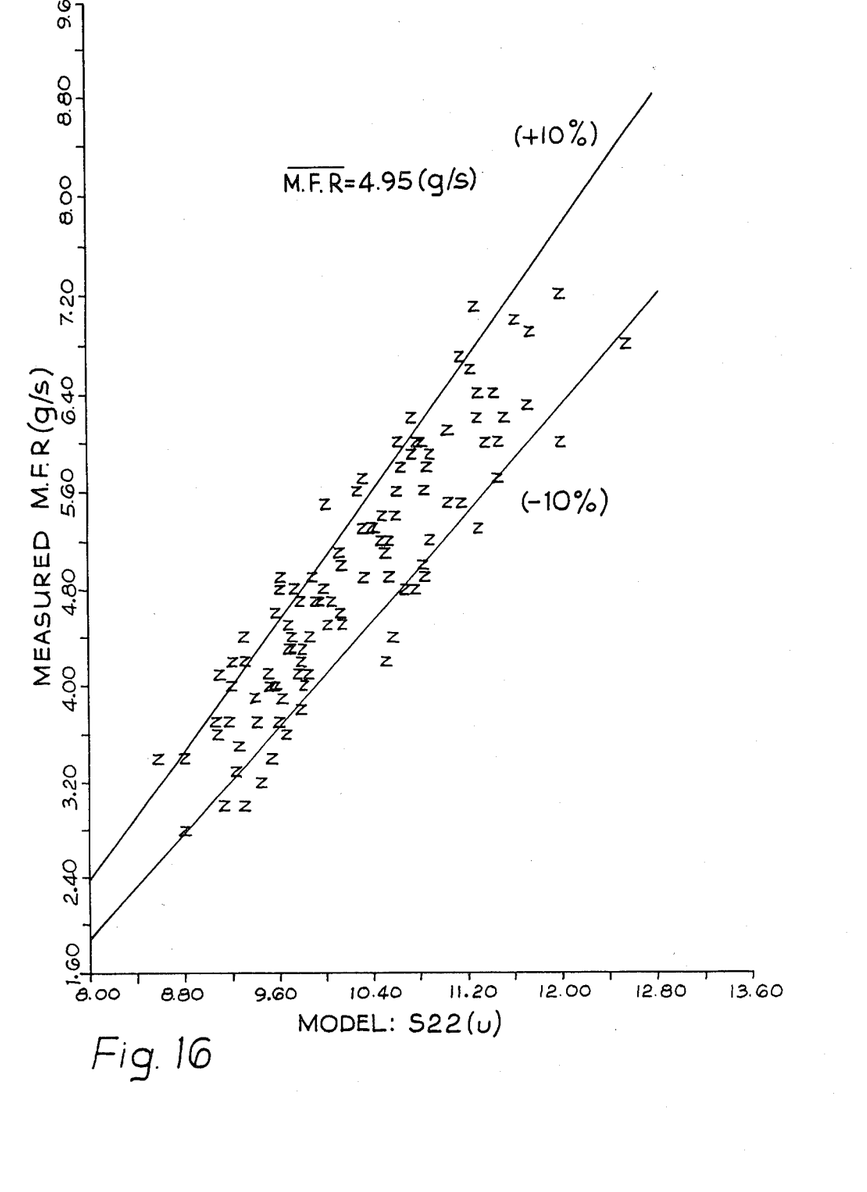
FIG. 16 shows a graph for calculation of high mass flow rates.

The remainder of the data is classed as falling in the high flow rate category and the quantity S22 is used to determine flow rates within this range using the graph of FIG. 16. The flow rate range on the high rate is accurate to within a 10% error rate from 3.0 to 8.0 grammes per second for over 90% of the readings calibrated.

The three ranges cover the normal powder flow rates used in industrial processes such as spraying. The processes can be controlled therefore by measuring the actual flow rate and adjusting this to a desired flow rate. The range, high, low or medium can for example be selected by manual switch means on the spray control apparatus. Thereafter the flow rates can be obtained using fixed multipliers, adders and substraction circuits for each range or by a computer program selected by the range setting or changed automatically by the calculation of the criteria for low, medium and high ranges.

We claim:

1. Flow measurement apparatus for the measurement of the mass flow of powder in a powder/air mixture stream in which the amount of powder and air are independently variable in an unknown manner comprising:
    means for injecting a plurality of pulses of charge of predetermined value into the powder/air mixture stream via a corona needle located along an axis of the apparatus;
    sensors located downstream for measurement of the amount of charge injected and the amount of charge conveyed to the powder following each pulse of charge;
    means for determining the velocity of the power flow by measurement of the time of flight for the powder between sensors; and
    electronic processing means for processing measurements of the predetermined charge injected and of the conveyed charge to a charge ratio and combining said ratio with the velocity measurement to calculate the powder mass flow rate.

2. Flow measurement apparatus as claimed in claim 1 in which the conveyed charge is measured at three points downstream by first, second and third separate sensors.

3. Flow measurement apparatus as claimed in claim 2 in which the distance between adjacent three sensors is constant.

4. Flow measurement apparatus as claimed in claim 3 including means for generating from the amount of injected charge and one or more of the sensed conveyed charges a plurality of functions each function being used to calculate powder mass flow rate within a plurality of flow rate ranges.

5. Flow measurement apparatus as claimed in claim 4 in which the functions are $R1 \propto I_2/I_{INJ}$ $R2 = I_2/I_3$ $D22 \propto (I_2 -- I_3)^{1.4}/I_{INJ}$ and $S22 = (I_2/I_3)^{0.66} \times$ powder velocity where $I_2$ and $I_3$ are the charges or currents detected by second and third detectors and $I_{INJ}$ is the injected charge or current.

6. Flow measurement apparatus as claimed in claim 5 in which the tube is surrounded by a Faraday cage.

7. Flow measurement apparatus as claimed in claim 6 in which the means for injecting charge into the powder flow includes a narrow electrode the tip of which is within the powder flow and which is charged to a high potential voltage and including means for blowing compressed air past the tip of the narrow electrode.

8. A method of measuring the mass flow rate of a powder comprising:
    constraining the powder to flow in a tube in a required flow direction;
    injecting a plurality of pulses of electrical charge of predetermined value into the powder to be carried by the powder particles downstream;
    detecting at a plurality of positions downstream from the injection point a charge present at that position following each pulse of charge; and
    calculating from the predetermined value of injected electrical charge and detected charge the mass of powder flowing in the tube.

* * * * *